(12) United States Patent
Uozumi et al.

(10) Patent No.: US 10,408,853 B2
(45) Date of Patent: Sep. 10, 2019

(54) VELOCIMETER AND METHOD OF MANUFACTURING ARTICLE

(71) Applicant: CANON KABUSHIKI KAISHA, Tokyo (JP)

(72) Inventors: Takayuki Uozumi, Utsunomiya (JP); Hiroshi Koike, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 460 days.

(21) Appl. No.: 15/197,021

(22) Filed: Jun. 29, 2016

(65) Prior Publication Data

US 2017/0003312 A1 Jan. 5, 2017

(30) Foreign Application Priority Data

Jun. 30, 2015 (JP) ................. 2015-132151

(51) Int. Cl.
  *G01P 3/36* (2006.01)
  *G01S 17/58* (2006.01)
  *G01S 7/48* (2006.01)
  *G01S 7/491* (2006.01)

(52) U.S. Cl.
  CPC ............ *G01P 3/36* (2013.01); *G01P 3/366* (2013.01); *G01S 7/4808* (2013.01); *G01S 7/4913* (2013.01); *G01S 17/58* (2013.01)

(58) Field of Classification Search
  CPC . G01P 3/36; G01P 3/366; G01S 17/58; G01S 7/4808; G01S 7/4913

USPC .......................................................... 356/28
See application file for complete search history.

(56) References Cited

U.S. PATENT DOCUMENTS

| 5,187,538 A * | 2/1993 | Iwamoto | ................... G01P 5/26 356/28.5 |
| 5,812,250 A | 9/1998 | Ishida | |
| 10,030,966 B2 * | 7/2018 | Kuroki | ................. G01B 11/043 |

FOREIGN PATENT DOCUMENTS

| CN | 105277945 A | 1/2016 |
| JP | S62-076915 A | 4/1987 |
| JP | H06-197015 A | 7/1994 |
| JP | H07-128349 A | 5/1995 |
| JP | H08-015436 A | 1/1996 |
| JP | H08-304543 A | 11/1996 |
| KR | 10-1999-0045594 A | 6/1999 |
| WO | 02/06841 A2 | 1/2002 |
| WO | 2015/052839 A1 | 4/2015 |

* cited by examiner

*Primary Examiner* — Mark Hellner
(74) *Attorney, Agent, or Firm* — Canon U.S.A., Inc. IP Division

(57) ABSTRACT

A velocimeter configured to detect light modulated by a moving object with a Doppler effect and measure a velocity of the object includes a detector configured to detect the light, and a processor configured to perform binarization of a signal obtained by the detector, and measure a time duration over a predetermined number of pulse intervals in the signal obtained by the binarization to obtain a measurement value of the velocity. The processor is configured to determine the measurement value as an error based on a change in an index relating to the time duration.

7 Claims, 17 Drawing Sheets

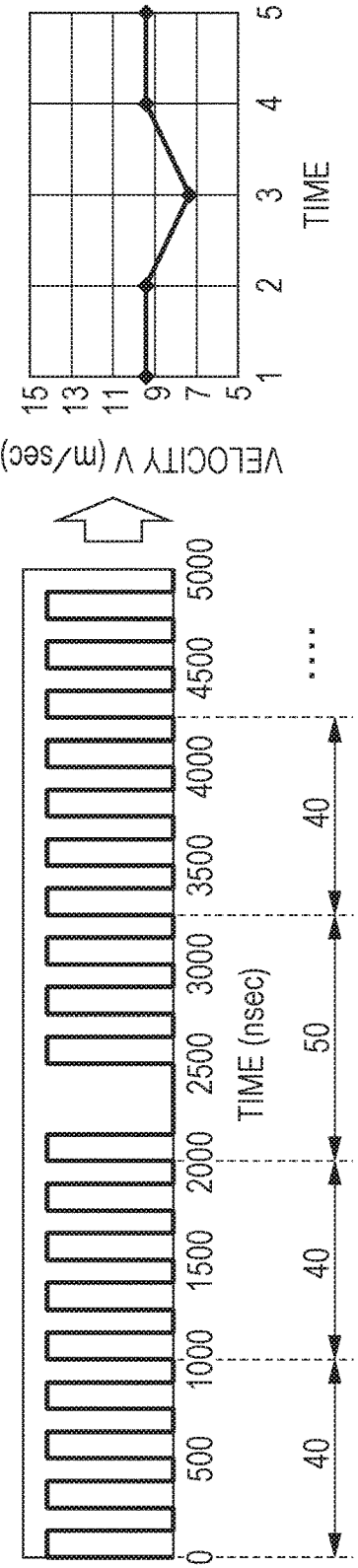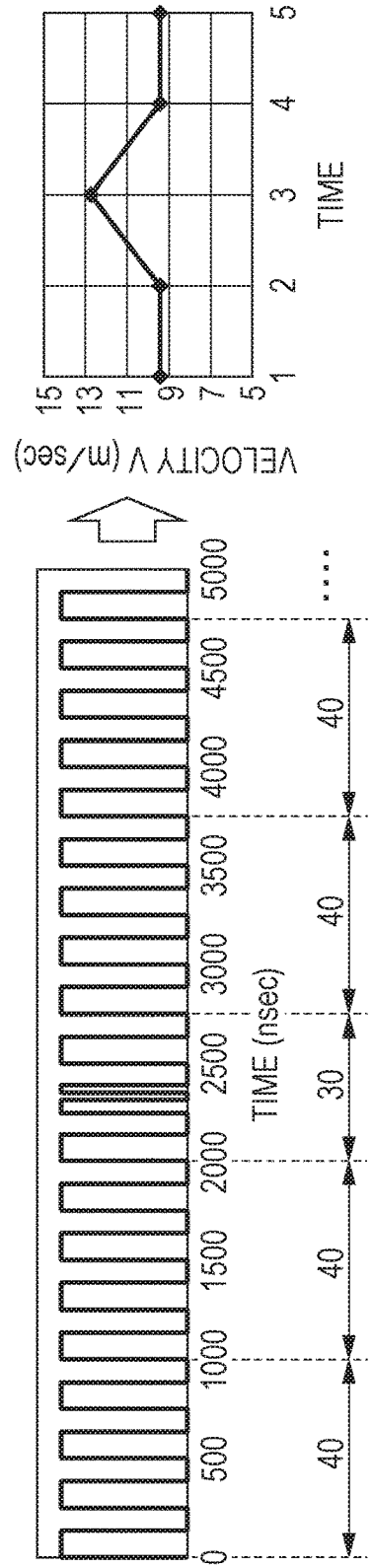

VELOCIMETER AND METHOD OF MANUFACTURING ARTICLE

BACKGROUND OF THE INVENTION

Field of the Invention

The present invention relates to a velocimeter that detects light modulated by a moving object with the Doppler effect and measures the velocity of the object, and also relates to a method of manufacturing an article.

Description of the Related Art

There has been used a Doppler velocimeter (hereinafter, also merely referred to as "velocimeter") as an apparatus that measures the velocity of a moving object. A laser Doppler velocimeter (LDV) irradiates an object with laser light, and measures the velocity of the object by using the Doppler effect. The Doppler effect is an effect that the frequency (wavelength) of scattered light from an object shifts in proportion to the moving velocity of the object. It is known that a signal obtained by LDV typically has a low signal-to-noise (S/N) ratio. It is also known that factors affecting measurement accuracy may be mixing of high frequency noise and lowering of the level of a Doppler signal, or so-called dropout.

In Japanese Patent Laid-Open No. 8-15436, a Doppler signal, which is obtained by a light detector and from which noise is removed by a band pass filter, is compared with a reference level, and a level detection signal is output. Also, the Doppler signal is binarized and hence a periodic error (also referred to as a period error or an error of a period) is detected, and a period error signal is output. Then, an error signal is detected on the basis of the level detection signal and the period error signal.

However, the method of detecting the error signal in Japanese Patent Laid-Open No. 8-15436 determines an error only when both a level error and a period error are generated but does not determine an error when only one of these is generated to handle a signal with a rapid variation in frequency. Hence, the measurement accuracy may be decreased due to mixing of noise when a dropout is not generated.

SUMMARY OF THE INVENTION

The present invention provides, for example, a velocimeter advantageous in measurement precision thereof.

The present invention provides a velocimeter configured to detect light modulated by a moving object with a Doppler effect and measure a velocity of the object. The velocimeter includes a detector configured to detect the light; and a processor configured to perform binarization of a signal obtained by the detector, and measure a time duration over a predetermined number of pulse intervals in the signal obtained by the binarization to obtain a measurement value of the velocity. The processor is configured to determine the measurement value as an error based on a change in an index relating to the time duration.

Further features of the present invention will become apparent from the following description of exemplary embodiments with reference to the attached drawings.

BRIEF DESCRIPTION OF THE DRAWINGS

FIGS. 10A and 10B exemplarily illustrate measurement values determined as errors.

DESCRIPTION OF THE EMBODIMENTS

Embodiments of the present invention are described below with reference to the attached drawings. The same reference sign is applied to the same member and so force throughout all the drawings for describing the embodiments and the repetitive description is omitted as a general rule (unless otherwise noted).

First Embodiment

Figure 1:
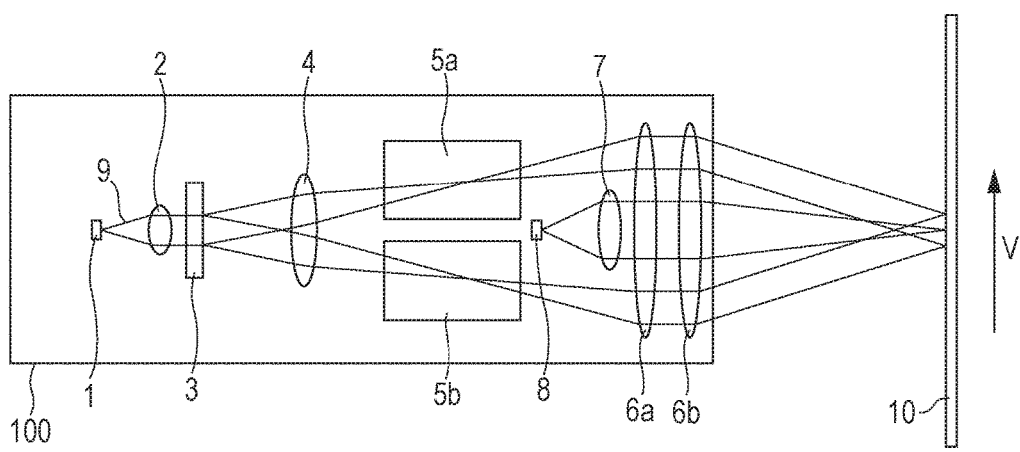
FIG. 1 illustrates a configuration example of a head unit of a velocimeter.

FIG. 1 illustrates a configuration example of a head unit of a velocimeter. A head unit 100 serving as a detector includes an optical system configured to irradiate an object (a measurement object) 10 with light and receive the light from the object 10, and configures a head unit of a laser Doppler velocimeter. Light rays 9 emitted from a light source 1, which may include a laser diode, are collimated by a collimator lens 2, and are incident on a diffraction grating (a diffractive element) 3. The light rays 9 incident on the diffraction grating 3 are split into ±1st order diffracted light rays (the diffraction angle being θ). The ±1st order diffracted light rays respectively become condensed light rays by a lens 4. The condensed light rays are respectively transmitted through EO elements 5a and 5b. The two transmitted light rays are collimated by lenses 6a and 6b, and irradiate the object 10 from mutually different irradiation directions at an angle substantially equivalent to the diffraction angle θ. The irradiating light rays are diffused and reflected by a surface (typically, a rough surface) of the object 10. The diffused and reflected light rays are condensed through the lenses 6a and 6b and a condenser lens 7, and incident on a light receiving element 8, which may include a photodiode. A signal obtained by photoelectric conversion at the light receiving element 8 is input to a processor (described later), as an analog signal having a frequency F corresponding to a velocity V of the object 10 and having a modulated intensity. The frequency F is called a Doppler frequency and expressed by Expression (1) as follows:

$$F=2V/P+F\_EO \qquad (1).$$

Figure 2A:
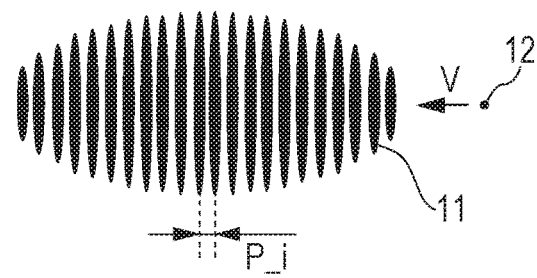
FIGS. 2A to 2C are schematic illustrations for describing a fringe model.
Figure 2B:
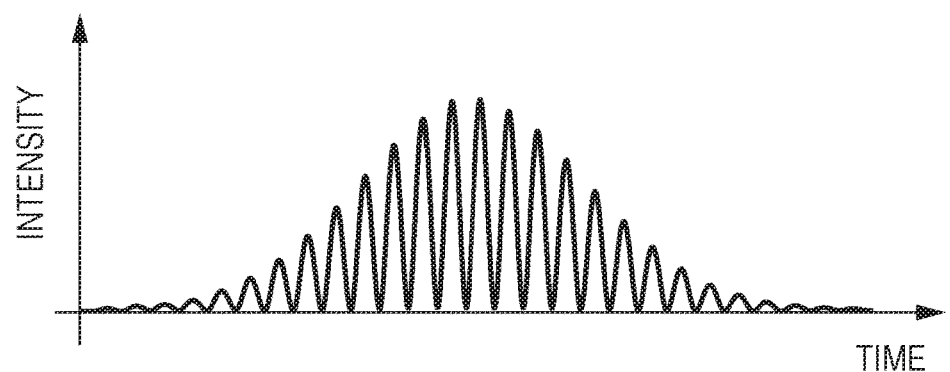
Figure 2C:
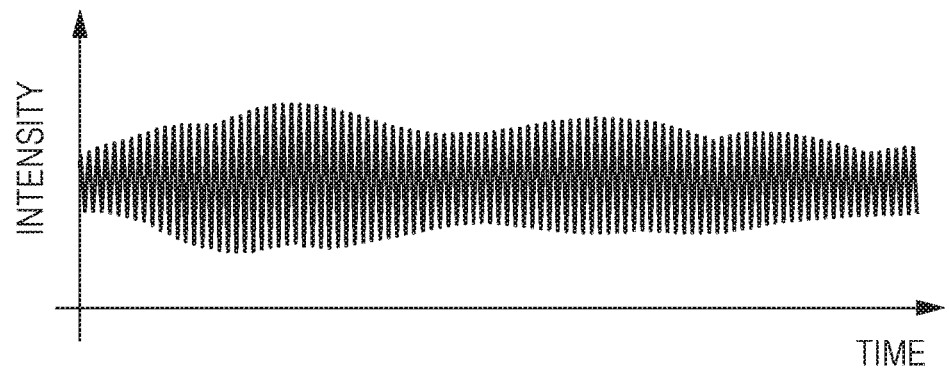

In the expression, P represents a grating pitch of the diffraction grating 3, and F_EO represents a drive frequency of the EO elements 5a and 5b. There is known a fringe (an interference fringe) model as a model for describing the operating principle of the laser Doppler velocimeter using the Doppler effect. FIGS. 2A to 2C are schematic illustrations for describing the fringe model. The two light rays irradiating the object 10 intersect with each other on the surface of the object 10, and hence a fringe 11 as shown in FIG. 2A is formed. A particle 12 with a size equal to or smaller than the fringe pitch of this fringe 11 passes through (bright and dark portions of) the fringe 11 at a velocity V, and hence diffused light having a frequency F and having a modulated intensity as shown in FIG. 2B is generated. The frequency F in this case is expressed by Expression (2) as follows:

$$F=V/P\_i \qquad (2).$$

Figure 6A:
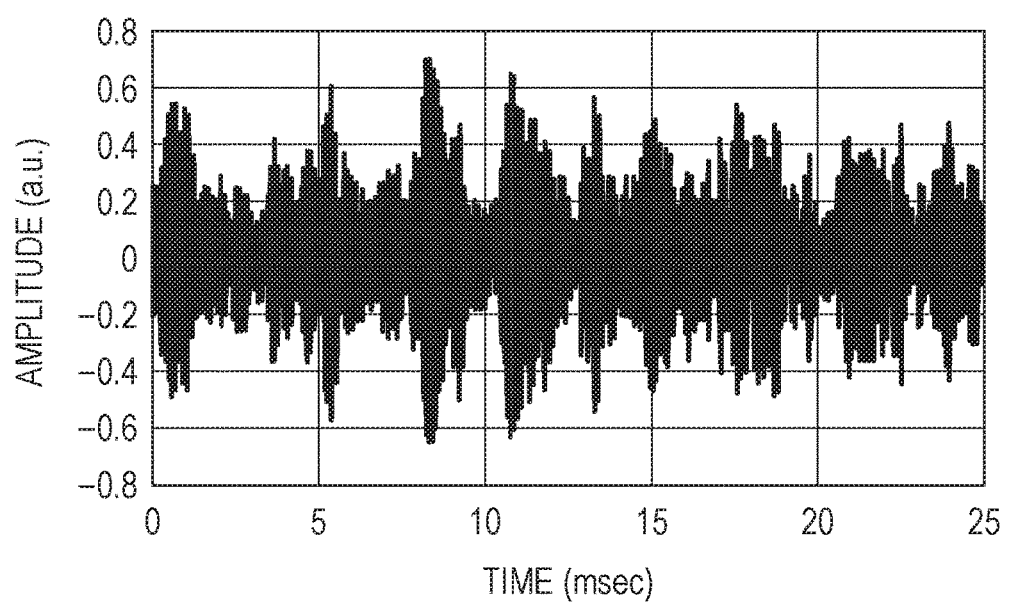
FIGS. 6A and 6B exemplarily illustrate an analog signal to be input to a processor.
Figure 6B:
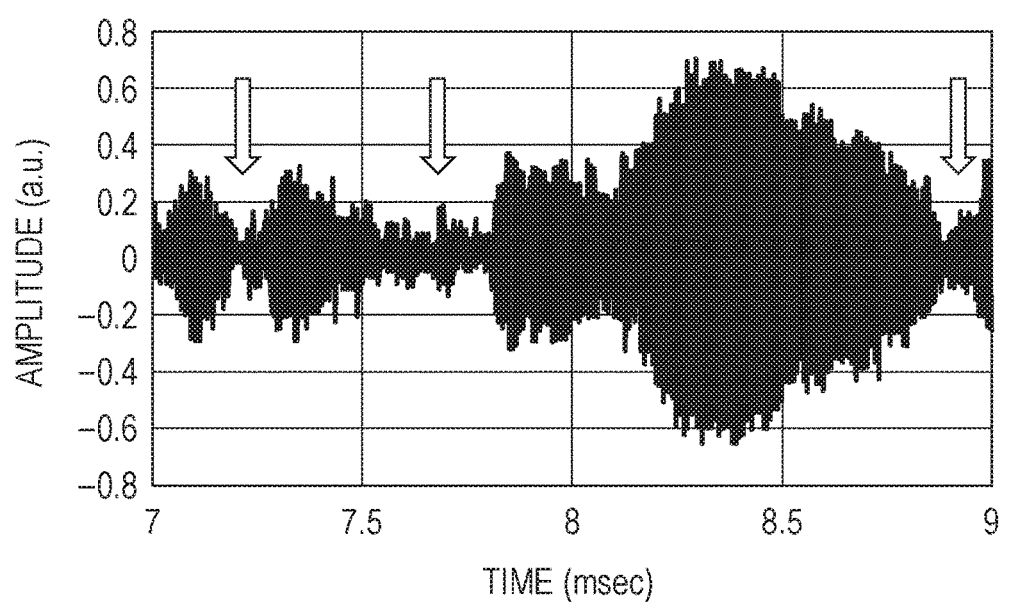

In the expression, P_i represents a fringe pitch. The diffraction angle θ is derived from a relational expression sin θ=λ/P, where λ is a wavelength of the light rays 9 emitted from the light source 1. Also, if a configuration is made so that the incident angle of the light rays on the object 10 is equivalent to the diffraction angle θ, the fringe pitch P_i can be expressed as P_i=λ/2 sin(θ)=P/2. By using this relational expression and Expression (2), the first term on the right side of Expression (1) is derived. Also, a low frequency component (an envelope component) in FIG. 2B reflects the intensity distribution of the light rays 9 emitted from the light source 1, and may typically reflect a Gaussian distribution. The surface of the object 10 has random surface roughness and may be considered as a set of particles 12 having a plurality of random characteristics. Hence, by obtaining the sum total of signals as shown in FIG. 2B having a plurality of random phases and amplitudes, a signal as shown in FIG. 2C is obtained. FIGS. 6A and 6B exemplarily illustrate an analog signal to be input to a processor 101 (described later). Since the signal in FIG. 2C obtained in accordance with the fringe model is similar to the actual signal in FIGS. 6A and 6B, it is found that the fringe model can describe the operating principle of the laser Doppler velocimeter.

Figure 3:
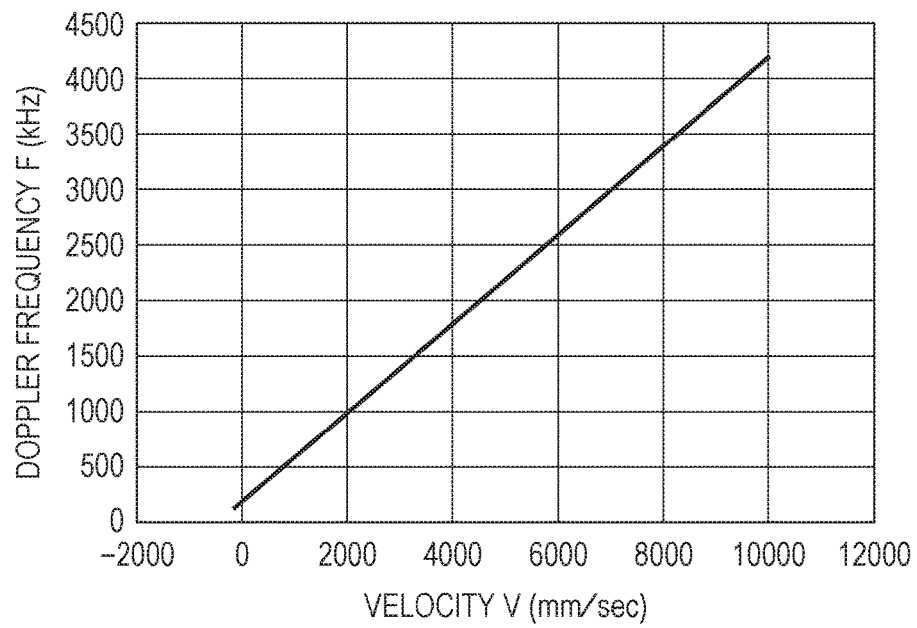
FIG. 3 exemplarily illustrates the relationship between the velocity of an object and the Doppler frequency.

The second term on the right side of Expression (1) is described next. The signal in FIG. 2C has a high frequency component reflecting the velocity of the object 10 and a low frequency component reflecting the surface characteristics of the object 10. Hence, as the velocity V approaches 0, it may be more difficult to obtain the velocity from the signal. Also, the direction of the velocity V cannot be detected. Owing to this, the EO elements are provided in FIG. 1. The EO elements 5a and 5b may include, for example, electrooptic crystal (for example, including LiNbO₃ crystal) and may each be an electrooptic phase modulation element. Since such an element is included, the velocity of the object is obtained even when the object is stopped and the direction of the velocity is obtained. The EO elements 5a and 5b can change the phases of light rays transmitted therethrough by an applied voltage. If the EO elements 5a and 5b modulate the two light rays, which are respectively transmitted therethrough, to change the phases to be in the mutually opposite directions with a constant frequency F_EO, the fringe 11 is moved with the frequency F_EO by one pitch each. For example, the applied voltage to the EO elements 5a and 5b is changed into a sawtooth shape, and accordingly, the apparent change in the phases may be constant. As described above, if a stationary particle 12 is placed while the fringe 11 moves with the frequency F_EO, diffused and reflected light having the intensity modulated with the frequency F_EO is generated. This is equivalent to a case in which the velocity is offset in a certain direction. Hence, by configuring the laser Doppler velocimeter including the EO elements 5a and 5b as described above, the stationary state (zero velocity) and the direction of the velocity can be detected. For example, the relationship between the velocity V and the Doppler frequency F in a case of a grating pitch P of the diffraction grating 3=5 [μm] and F_EO=200 [kHz]. FIG. 3 exemplarily illustrates the relationship between the velocity of an object and the Doppler frequency. When the lower limit is 100 [kHz] and the upper limit is 4.2 [MHz] for the frequency of the signal that can be processed by the processor (described later), the measurable velocity range is a range from −250 [mm/s] to 10 [m/s]. The values of the grating pitch P and the phase modulation frequency F_EO can be properly selected in accordance with the specifications of the laser Doppler velocimeter. The example of performing the phase modulation with the EO elements has been described here; however, phase modulation may be performed with another element such as an acousto-optic element.

Figure 4:
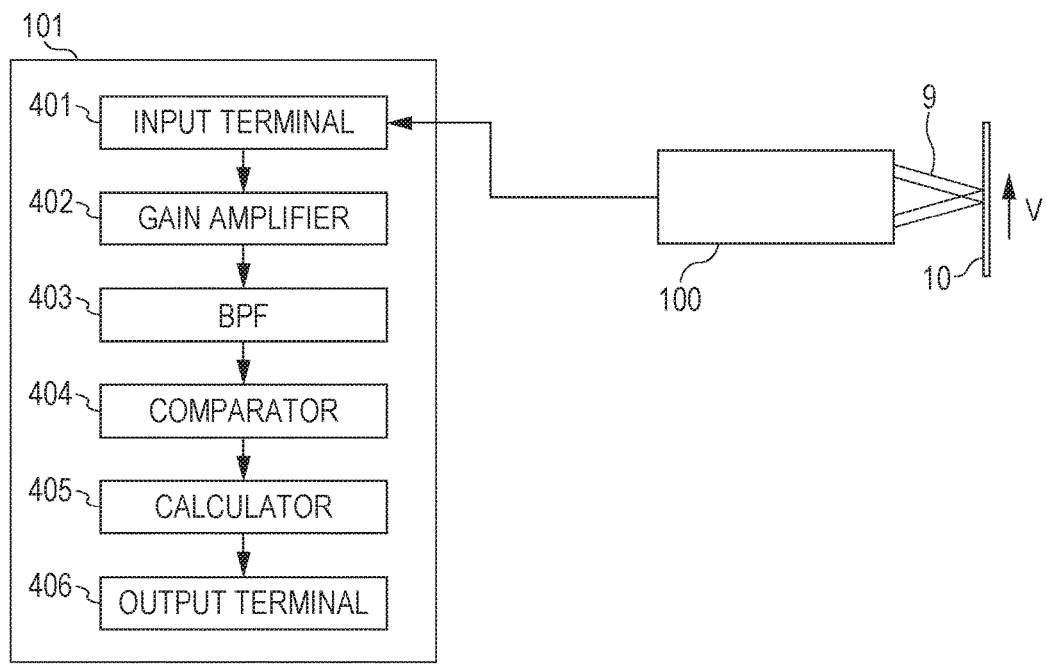
FIG. 4 illustrates a configuration example of the velocimeter.

FIG. 4 illustrates a configuration example of the velocimeter. The intensity modulation signal having the frequency F obtained by the head unit 100 is input to the processor 101 as described above. The analog signal input to the processor through an input terminal 401 is amplified by a gain amplifier, then filtered by a band pass filter (BPF) 403, and binarized by a comparator 404. Based on the signal obtained by the binarization, (information on) the velocity is obtained by a calculator 405 and (the information on) the obtained velocity is output from an output terminal 406.

Figure 5A:
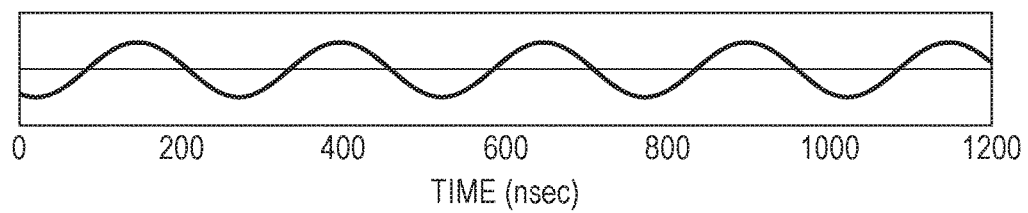
FIGS. 5A to 5C exemplarily illustrate signal processing contents.
Figure 5B:
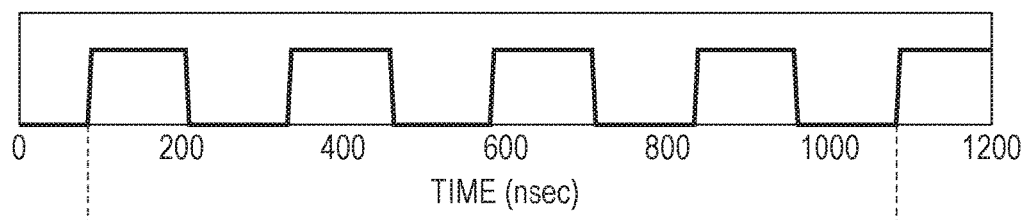
Figure 5C:
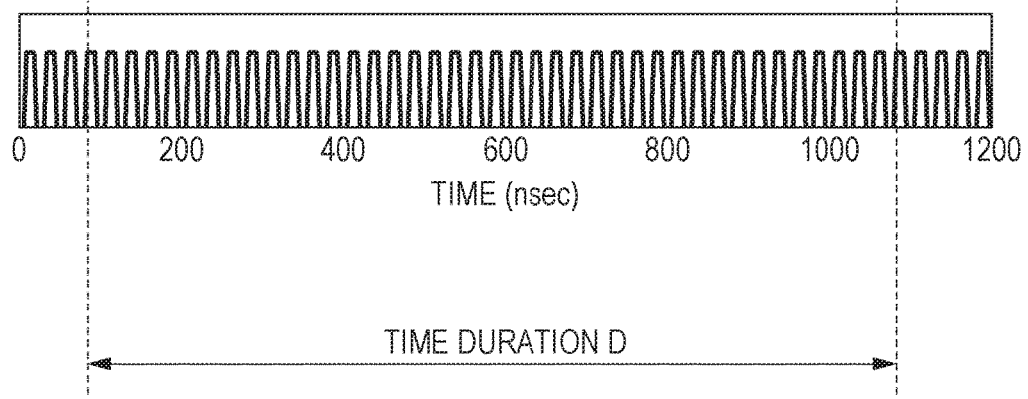

FIGS. 5A to 5C exemplarily illustrate signal processing contents. FIG. 5A shows an input signal and FIG. 5B shows a signal obtained by binarization by the comparator when the velocity V of the object 10=9500 [mm/s] and the Doppler frequency F=4 [MHz]. FIG. 5C shows a (reference) clock signal in the processor 101. A reference clock (not shown) that gives the clock signal may be located inside or outside the processor. In this case, the reference clock frequency is 40 [MHz]. In this embodiment, continuous N rising intervals in the signal obtained by the binarization are clocked (counted) with the reference clock. One rising interval is a time interval between two rising timings (a timing is also referred to as a time) at two adjacent pulses. The Doppler frequency F is obtained on the basis of a time (a time duration D) obtained by the clocking, and (the information on) the velocity V of the object 10 is obtained on the basis of Expression (1). In this case, it is assumed that N=4. In the case of FIG. 5B and FIG. 5C, the count value of four rising intervals in the signal obtained by the binarization is 40 (counts). Since the frequency of the reference clock is known, the Doppler frequency F can be obtained from the count value (the clock value). The velocity V may be obtained by calculation based on Expression (1), or may be obtained with reference to a prepared table showing the relationship between the count value (the clock value) and the velocity. The frequency of the reference clock is 40 MHz in this case; however, the frequency of the reference clock may be properly selected in accordance with a required Doppler frequency.

FIGS. 6A and 6B exemplarily illustrate an analog signal to be input to the processor 101 as described above. FIG. 6B shows a portion of FIG. 6A in an enlarged manner. As described above, the signal output from the head unit 100 is a signal with a large change in amplitude theoretically generated in a Doppler signal. Also, noise generated in an electric circuit (for example, switching noise of a power supply, or noise accompanied by driving of the EO elements) is superimposed on current for driving the light source 1. Hence, low frequency noise and high frequency noise are mixed into the signal output from the head unit 100 in addition to the Doppler signal. The states of the signal indicated by arrows in FIG. 6B are states with small amplitudes of low frequency components. In a state (a portion) lower than the threshold of the binarization by the comparator, the signal obtained by the binarization is zero (lacks). Such a state is also called dropout. Also, a state (a portion) higher than the threshold due to the high frequency noise component, a signal different from the Doppler signal may be included in the signal obtained by the binarization.

Figure 7:
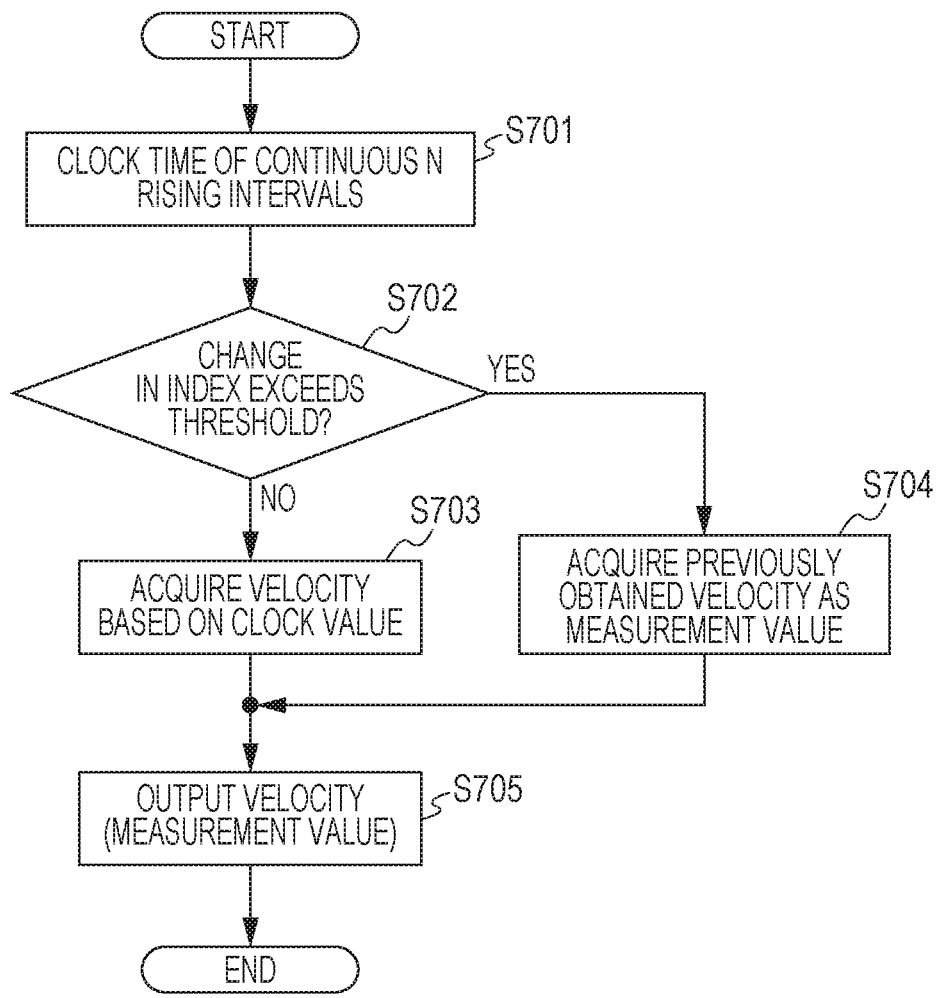
FIG. 7 exemplarily illustrates a flow of processing in the processor.
Figure 8A:
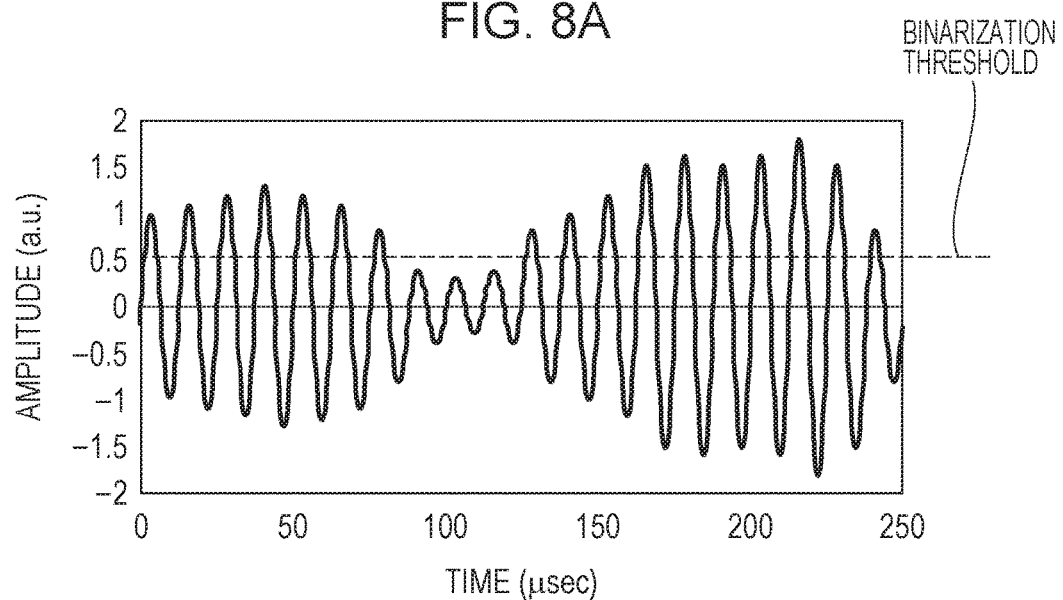
FIGS. 8A and 8B exemplarily illustrate a signal when a dropout is generated.
Figure 8B:
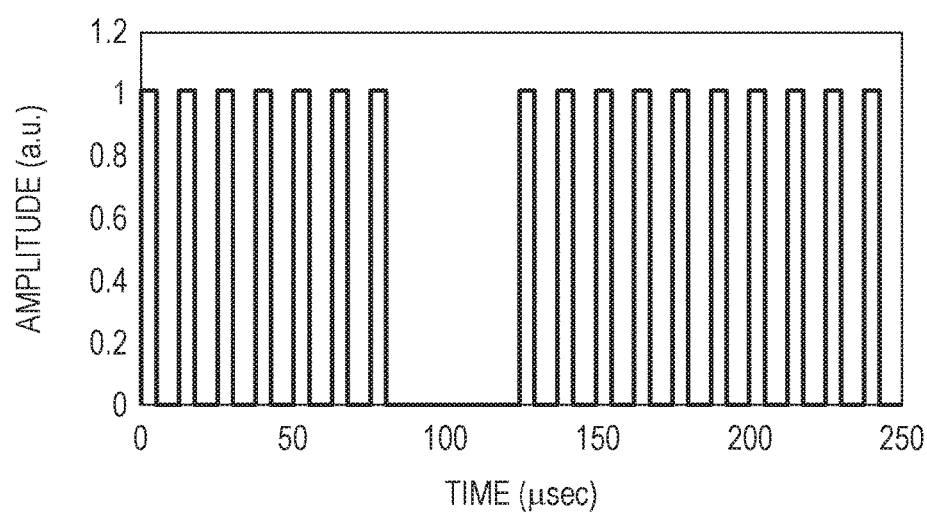
Figure 9A:
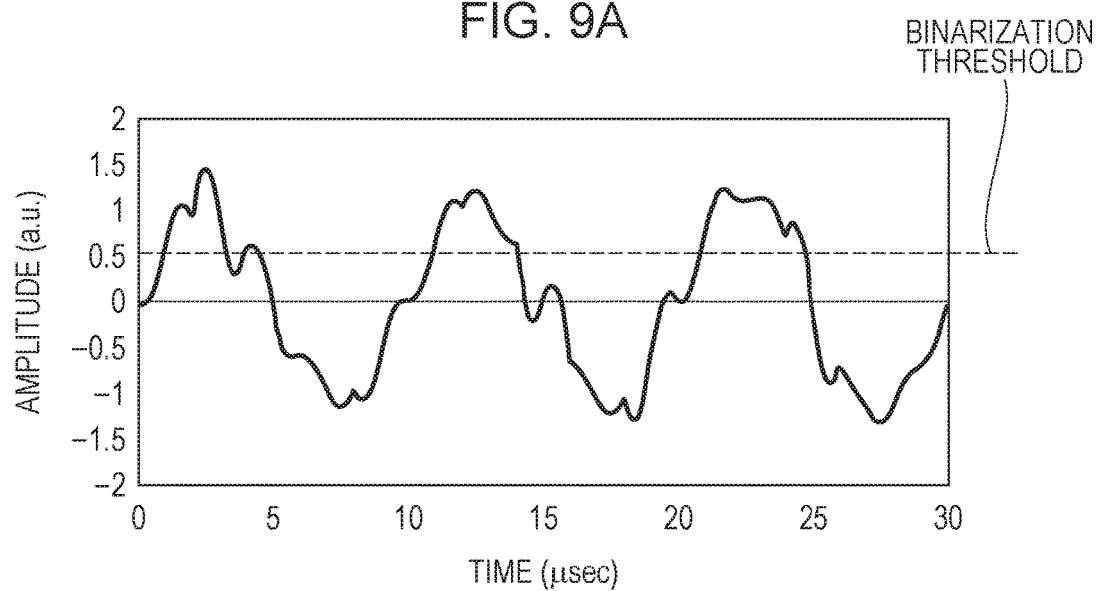
FIGS. 9A and 9B exemplarily illustrate a signal when noise is mixed.
Figure 9B:
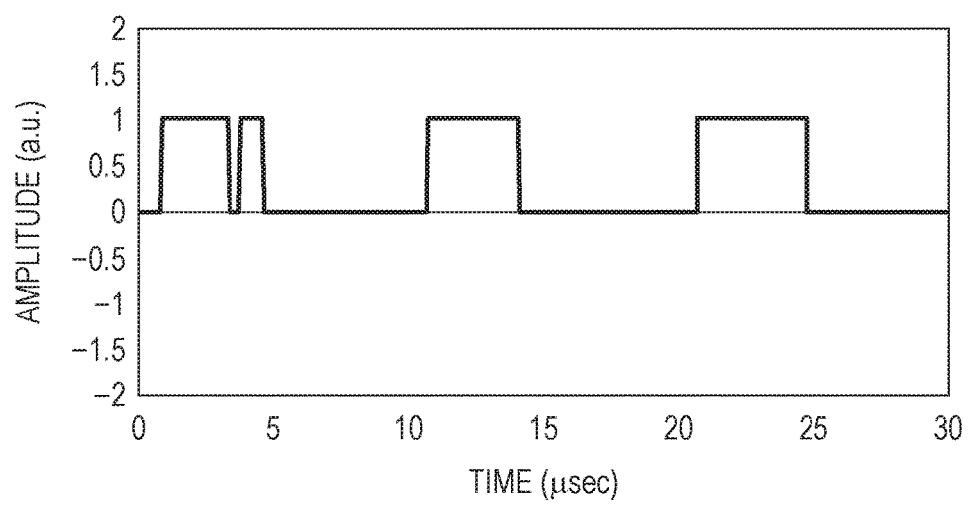

FIG. 7 exemplarily illustrates a flow of processing by the calculator in the processor. In the processor 101 of FIG. 4, the signal obtained by the binarization by the comparator is input to the calculator 405. First, in step S701, the calculator 405 clocks (counts) a time (a time duration over a predetermined number of pulses) of continuous (a series of) N rising intervals (pulse intervals) in the signal obtained by the binarization by using the reference clock as shown in FIGS. 5A to 5C. In subsequent step S702, it is determined whether or not a change in an index relating to the time duration (the clock value) exceeds a threshold. The index may be the time duration D, the Doppler frequency F corresponding to the time duration D, the velocity V of the object 10 corresponding to the Doppler frequency F, or another value correlating to these values. FIGS. 8A and 8B exemplarily illustrate a signal when a dropout is generated. If a dropout is generated in an analog signal including a Doppler signal at a time around 100 μsec as shown in FIG. 8A, a pulse lacks in the signal obtained by binarization as shown in FIG. 8B. Also, FIGS. 9A and 9B exemplarily illustrate a signal when noise is mixed. If noise is mixed into an analog signal including a Doppler signal at a time around 3 μsec as shown in FIG. 9A, a pulse splits in the signal obtained by the binarization as shown in FIG. 9B.

FIGS. 10A and 10B exemplarily illustrate measurement values determined as errors. FIG. 10A exemplarily illustrates a velocity (a measurement value) obtained if a dropout as shown in FIG. 8B is present. When the rising intervals of every N=4 are clocked, the count value of the reference clock may be 50 counts as the result that a pulse lacks due to a dropout. If the velocity is obtained on the basis of such clock values, the velocity is like a graph on the right side in FIG. 10A. If the number of pulse lacks due to dropouts increases, the number of errors of measurement values also increases. FIG. 10B exemplarily illustrates a velocity (a measurement value) obtained if noise as shown in FIGS. 9A and 9B is mixed. Even in this case, when the rising intervals of every N=4 are clocked, the count value of the reference clock may be 30 counts as the result that a pulse splits due to mixing of noise. If the velocity is obtained on the basis of these clock values, the velocity is like a graph on the right side in FIG. 10B. If the number of pulse splits due to mixing of noise increases, the number of errors of measurement values also increases.

A change in the count values continuously acquired in time series may be considered to be within a predetermined range with regard to a change in the velocity of the object 10 within a predetermined time. For example, when the velocity V of the object 10 is currently 9.5 [m/s] and changes with an acceleration of 10 [m/s$^2$], a change in the velocity in the time duration D of every N=4 is only 10 [μm/s]. Regarding the ratio of the change in the velocity to the velocity, although the ratio is inversely proportional to the velocity, the change in the velocity is about 0.17 [mm/s] and is sufficiently small even if V=0.1 [m/s] (the ratio being about 0.17%). Therefore, if the change in the index exceeds L [%] of a previously obtained index, it may be determined that a dropout or mixing of noise is generated. L is expressed by Expression (3) as follows:

$$L=((N+1)/N-1)\times 100 \quad (3).$$

Accordingly, the threshold in step S702 in FIG. 7 can be obtained as L [%] of the (previously obtained) index. Then, if the change in the index is the threshold (L [%] of the index) or smaller, the velocity (the measurement value) is obtained on the basis of the clock value in step S703. In contrast, if the change in the index exceeds the threshold (L [%] of the index), the velocity corresponding thereto is determined as an error, and the previously obtained velocity is used as the measurement value in step S704. In subsequent step S705, the processor 101 outputs the velocity (the measurement value) to another apparatus that requires the information on the velocity. Alternatively, the threshold may be a×L [%] of the index (the coefficient a is a real number that satisfies 0<a<1).

Figure 11A:
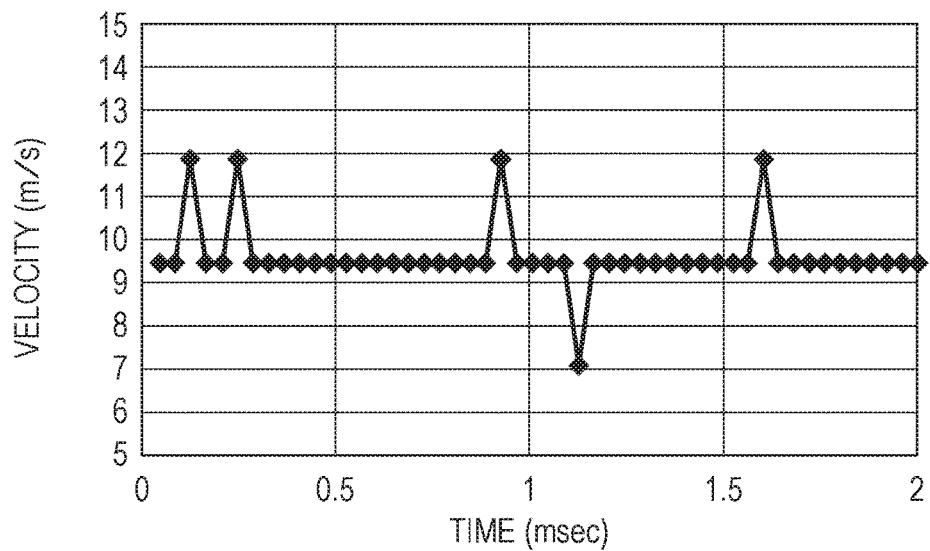
FIGS. 11A and 11B exemplarily illustrate measurement values before correction and measurement values after correction.
Figure 11B:
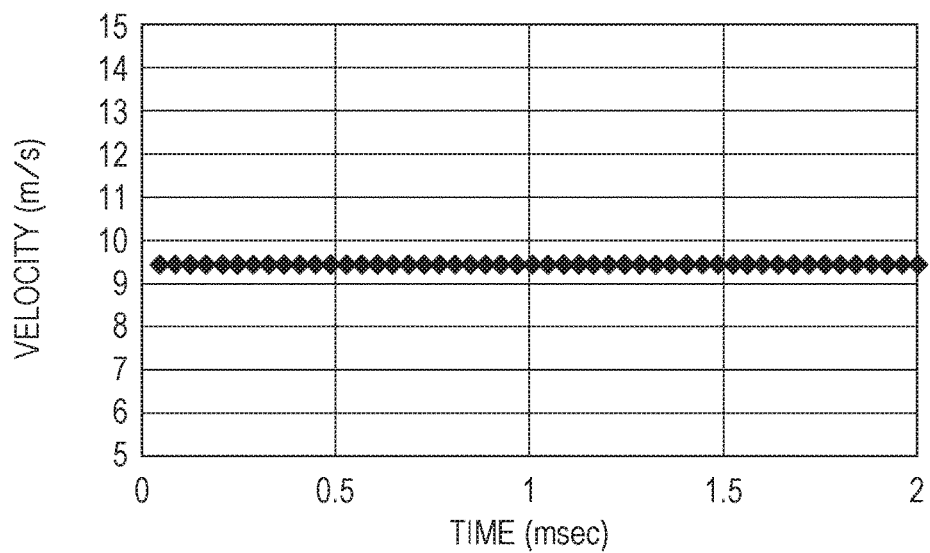

FIGS. 11A and 11B exemplarily illustrate measurement values before correction and measurement values after correction. FIGS. 11A and 11B show the measurement results of the velocity when the object 10 moves at a velocity V≈0.5 [m/s]. FIG. 11A shows the measurement result when the correction (step S702 to step S704) according to this embodiment is not performed. FIG. 11B shows the measurement result when the correction is performed. Referring to FIGS. 11A and 11B, it is found that the measurement result with high accuracy (high reproducibility) as shown in FIG. 11B can be obtained according to this embodiment.

As described above, with this embodiment, robust measurement can be performed against a dropout and mixing of noise. Accordingly, for example, the velocimeter advantageous in view of measurement accuracy can be provided.

Figure 12:
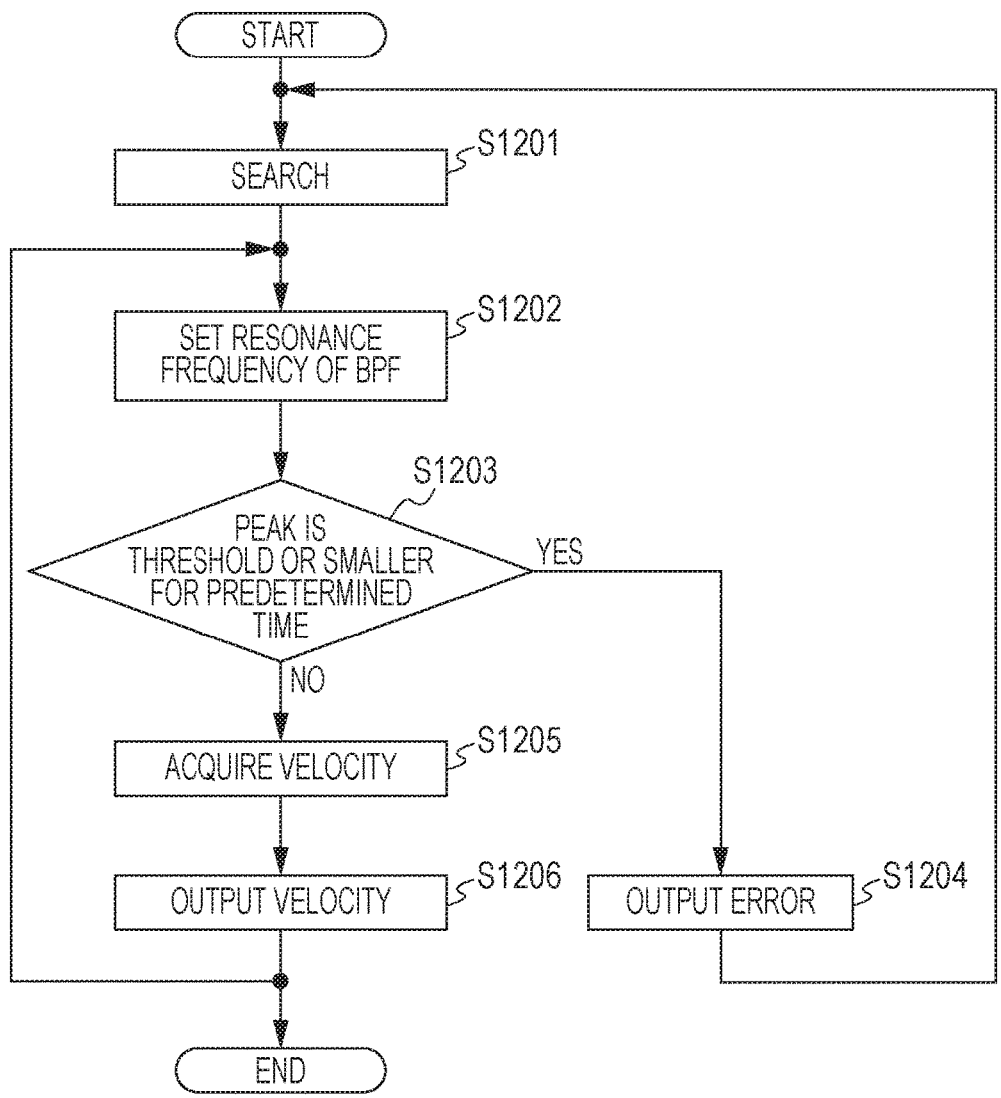
FIG. 12 exemplarily illustrates a flow of signal processing.
Figure 13:
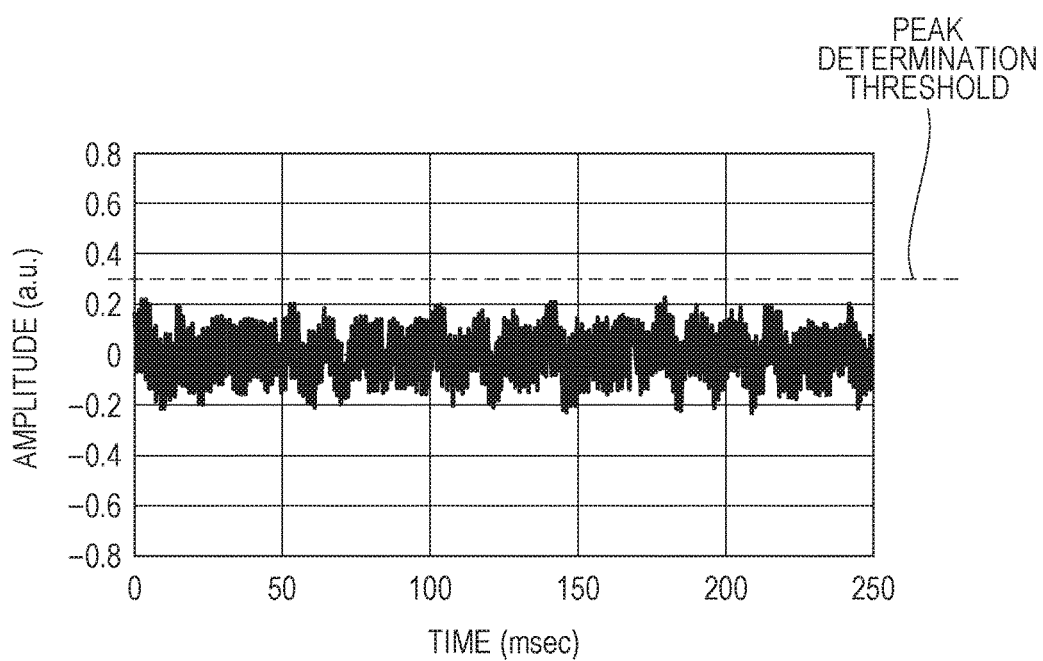
FIG. 13 illustrates another example of an analog signal to be input to the processor.

Another aspect of the processor 101 is described next. The band pass filter (BPF) 403 of the processor 101 shown in FIG. 4 is prepared for decreasing noise having a frequency other than the Doppler frequency. In this case, a Q value of the BPF 403 is set at about 6 although the Q value is not limited to 6. Since the Doppler frequency expands in a wide band, a BPF with a variable resonance frequency (center frequency) is employed. The BPF may be realized by making at least one of R, L, and C of a RLC filter variable. FIG. 12 exemplarily illustrates a flow of signal processing. First, in step S1201, the resonance frequency of the BPF is determined by search (described later). In subsequent step S1202, the resonance frequency of the BPF is set. In step S1203, the analog signal input to the processor 101 is filtered by the BPF, and input to the comparator. In this step, the level is determined for the signal obtained by the filtering. In the case of the analog signal as shown in FIGS. 6A and 6B, the signal processing can be performed by the filtering with the BPF. However, depending on the surface condition of the object 10, the analog signal may become the analog signal shown in FIG. 13, and a dropout may be generated in a long time duration. In this case, FIG. 13 illustrates another example of an analog signal to be input to the processor. With such a signal, it is difficult to perform accurate velocity measurement. Hence, in step S1203, peak hold processing is performed on the amplitude of the signal obtained by the filtering with the BPF, and it is determined whether the held peak is a previously set threshold or smaller for a previously set time. If the peak is the threshold or smaller (YES), the signal is determined as an error (step S1204), and the processing is returned to step S1201 (search). In contrast, if the peak is not the threshold or lower (NO), the signal obtained by the filtering with the BPF is binarized by the comparator 404, and is further processed by the calculator 405. In subsequent step S1205, the calculator 405 obtains the velocity of the object 10. In subsequent step S1205, the processor 101 outputs the velocity (information) from the output terminal 406 to another apparatus.

Figure 14:
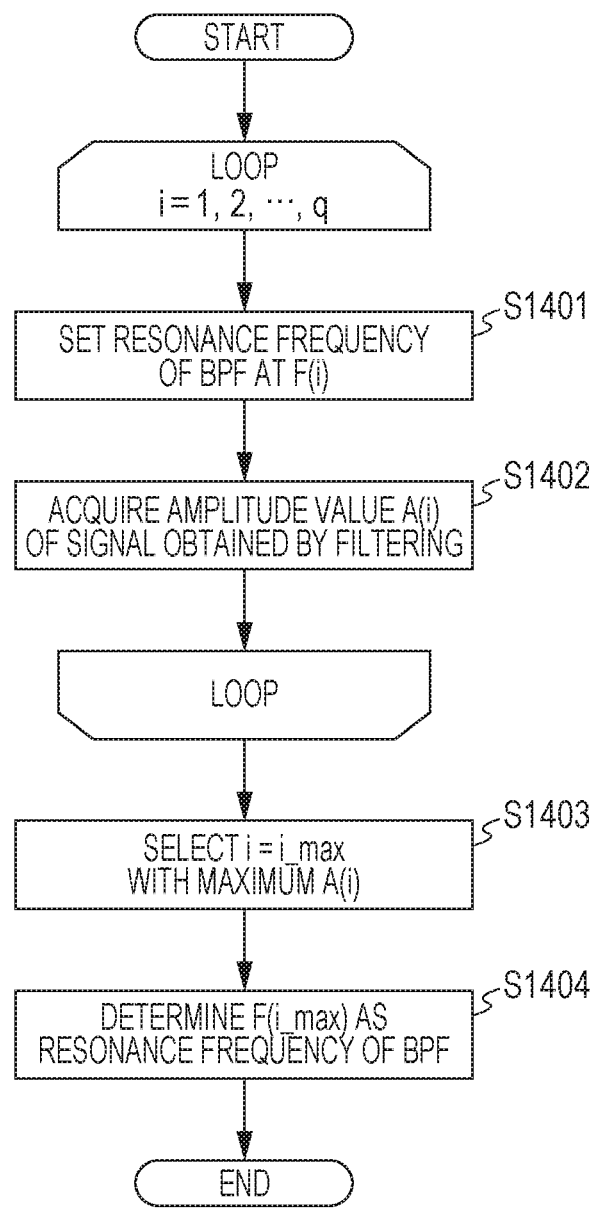
FIG. 14 illustrates an example of a flow of processing in S1201 (search).
Figure 17A:
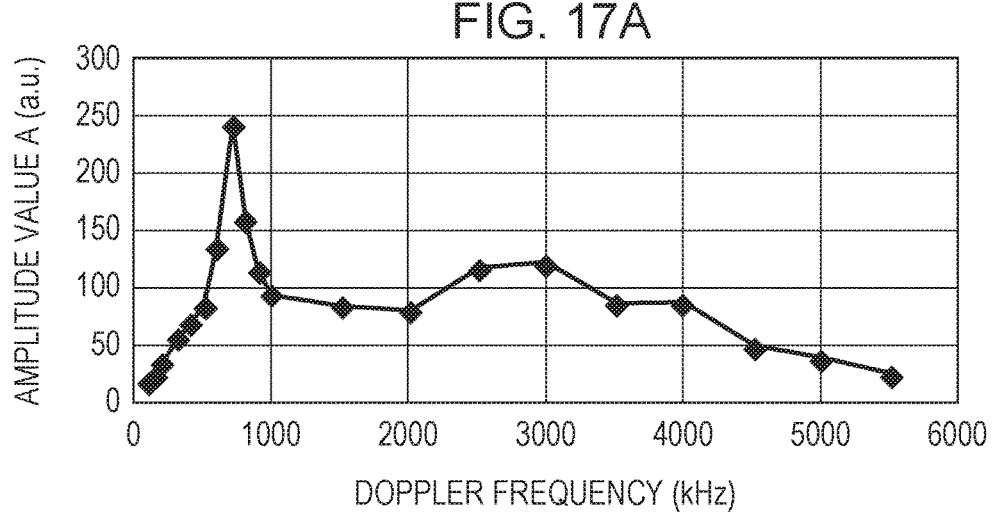
FIGS. 17A to 17C each illustrate an example relating to signal processing contents in S1201 and S1601.
Figure 17B:
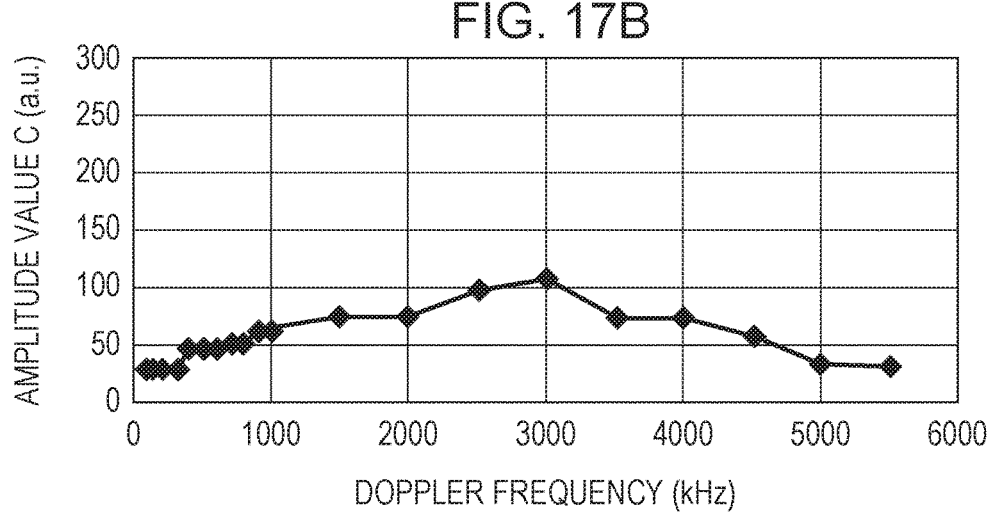
Figure 17C:
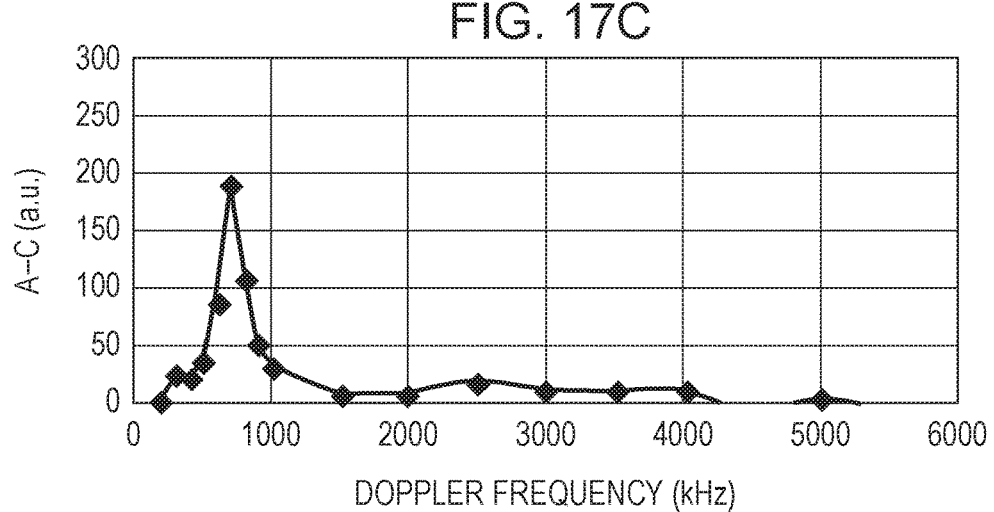

Step S1201 (search) in FIG. 12 is a step of determining the resonance frequency of the BPF in accordance with the Doppler frequency in the analog signal to be input to the processor 101. FIG. 14 illustrates an example of a flow of processing in S1201 (search). For i=1, 2, . . . , q, step S1401 and step S1402 are repeated (loop). In step S1401, a resonance frequency F(i) of the BPF is set. In subsequent step S1402, an amplitude value A(i) of the signal obtained by the filtering is acquired. In step S1403, which has escaped from the loop, i=i_max with the maximum A(i) is obtained. In subsequent step S1404, F(i_max) is determined as the resonance frequency of the BPF. FIGS. 17A to 17C each illustrate an example relating to signal processing contents in S1201 (search) and S1601 (calibration). Calibration is described later. In this example, the amplitude of the signal obtained by the filtering is about 700 [kHz] at maximum. Hence, it may be conceived that the Doppler frequency is about 700 [kHz]. Based on this consideration, in step S1201 (search), the resonance frequency of the BPF may be determined.

Figure 18A:
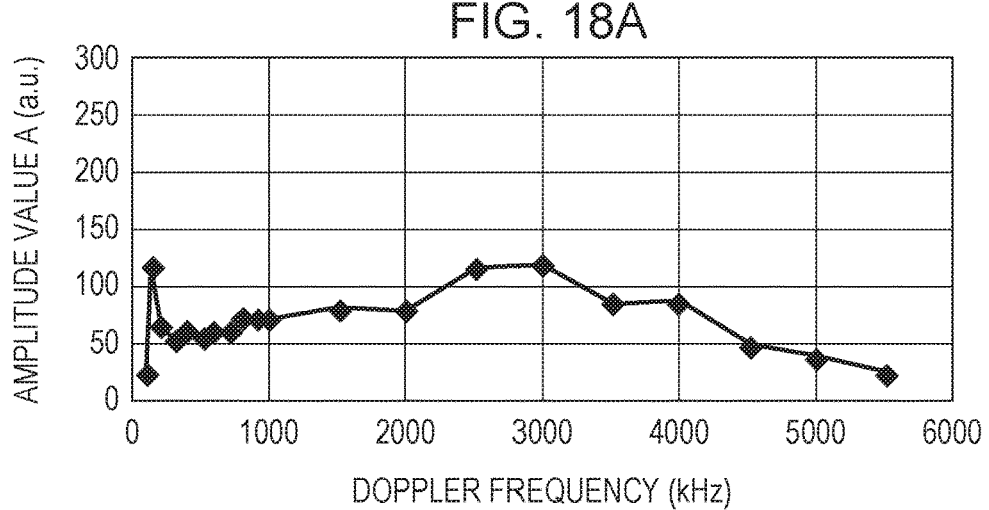
FIGS. 18A to 18C each illustrate a second example relating to signal processing contents in S1201 and S1601.
Figure 18B:
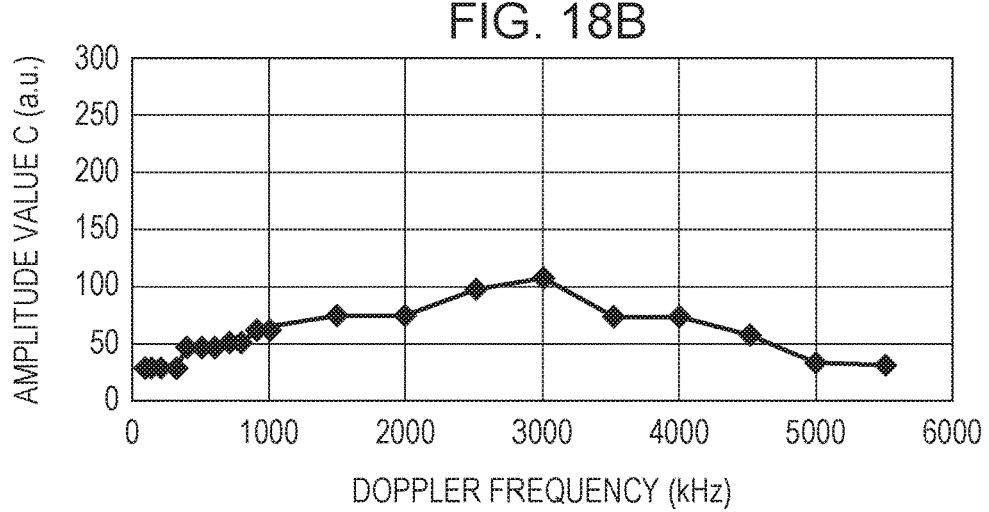
Figure 18C:
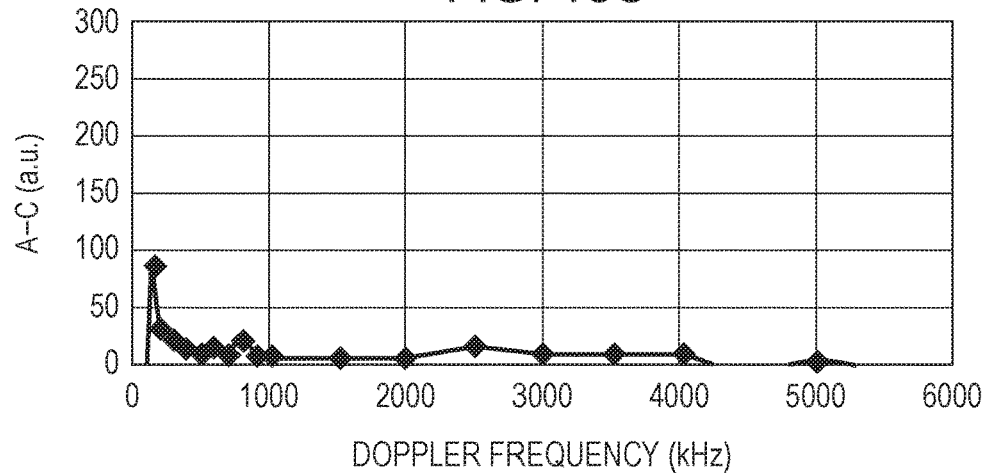

However, if the S/N ratio of the Doppler signal is low, a frequency far from the Doppler frequency may be determined as the resonance frequency of the BPF in step S1201 (search). FIGS. 18A to 18C each illustrate a second example relating to signal processing contents in S1201 (search) and S1601 (calibration). FIG. 18A illustrates the amplitude value A(i) of the signal obtained by the filtering when the S/N ratio of the Doppler signal is low. In this example, the Doppler frequency is about 150 [kHz]. However, the amplitude is about 3 [MHz] at maximum due to the influence by noise generated by the head unit 100. The noise component included in the head unit 100 is specific to each head unit, and is not depending on the Doppler frequency. Therefore, the velocimeter can be calibrated by previously acquiring information on this noise.

Figure 15:
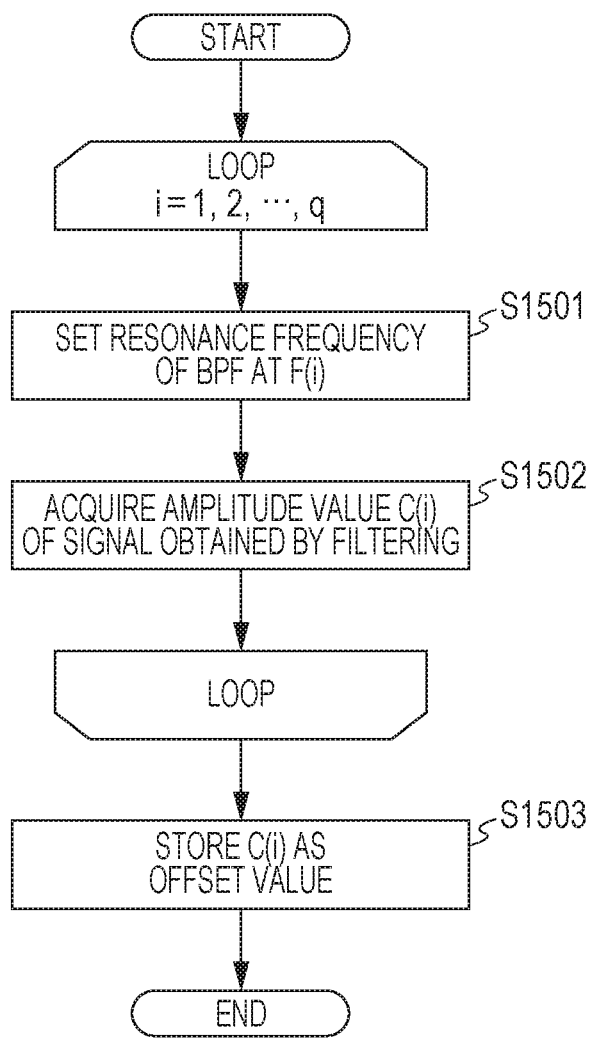
FIG. 15 exemplarily illustrates a flow of processing in S1601 (calibration).
Figure 16:
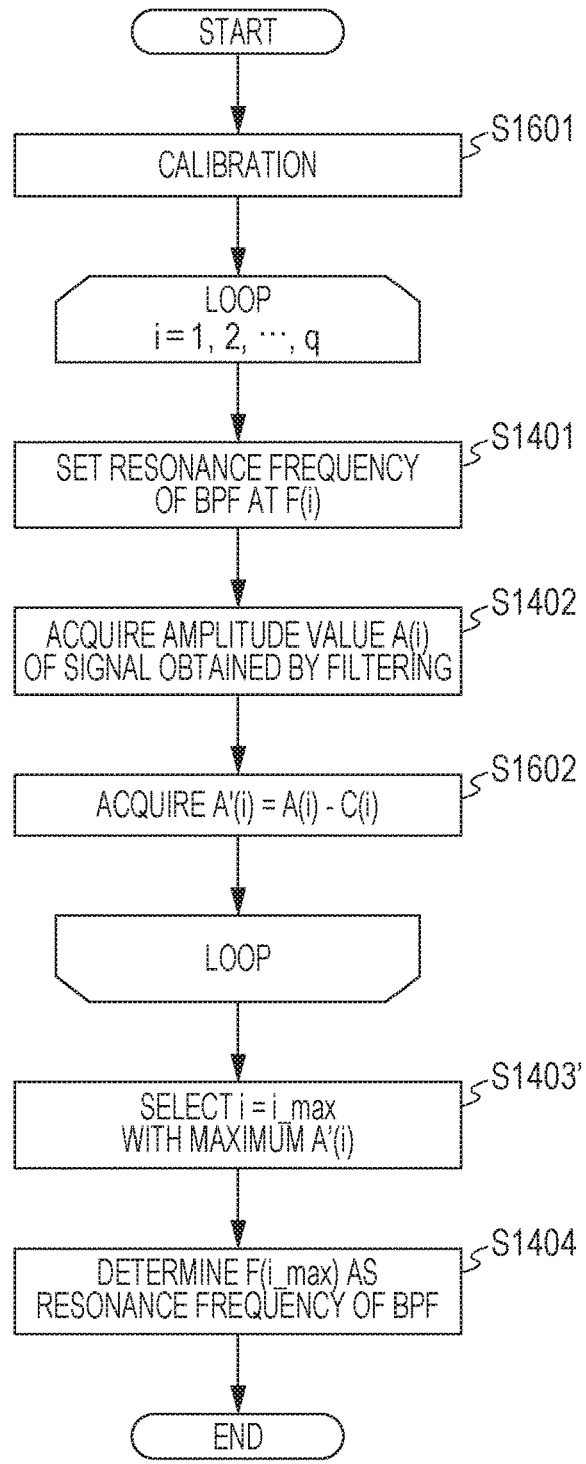
FIG. 16 illustrates a second example of a flow of processing in S1201 (search).

FIG. 15 exemplarily illustrates a flow of processing in S1601 (calibration) in FIG. 16. S1601 (calibration) is a step of previously acquiring information on a noise component specific to the head unit, and is performed without the object 10. For i=1, 2, . . . , q, step S1501 and step S1502 are repeated (loop). In step S1501, the resonance frequency F(i) of the BPF is set. In subsequent step S1502, an amplitude value C(i) of the signal obtained by the filtering is acquired. In step S1503, which has escaped from the loop, C(i) is stored as an offset value (a calibration value) in, for example, a memory in the processor 101. FIG. 17B and FIG. 18B are examples of offset values C(i) stored while the object 10 is not placed.

FIG. 16 illustrates a second example of a flow of processing in S1201 (search). The same or similar reference sign is applied to the step similar to that in the flow of the processing in FIG. 14, and the redundant description is omitted. First, step S1601 (calibration) is the processing described with reference to FIG. 15. In step S1602, the offset value C(i) obtained in step S1601 is subtracted from the amplitude value A(i) of F(i) acquired while the object 10 is placed, and an amplitude value A'(i), from which the influence of the noise component specific to the head unit 100 is decreased, is acquired. FIGS. 17C and 18C are examples of amplitude values A'(i). By performing the processing according to FIG. 16, even if the S/N ratio of the Doppler signal is low, the resonance frequency of the BPF can be further accurately determined. Also, if the processing (search) in step S1201 is performed again when determination is made as an error in step S1203 (peak determination) in the processing according to FIG. 12, measurement can be immediately started when the signal shown in FIG. 13 changes to the signal shown in FIGS. 6A and 6B.

As described above, as long as the processing described with reference to FIGS. 12 to 18C is performed, robust processing of acquiring the velocity with the velocimeter can be performed. The setting of the resonance frequency of the band pass filter (BPF) 403 may be performed, for example, when the velocimeter starts velocity measurement (for example, immediately before the start) or when an error occurs in velocity measurement (an error is continued with a predetermined condition satisfied). Also, while the velocity measurement is performed, the resonance frequency may be set (changed) on the basis of the measurement value of the velocity.

Second Embodiment

In the first embodiment, it is determined whether the change in the index exceeds the threshold or not on the basis of the threshold based on the previously (preparatorily) obtained index by the calculator 405 (in step S702). However, the threshold may be a threshold based on previously (preparatorily) obtained M indices (for example, an average of these). Also, the average may not be a simple average, and may be a weighted average, a synergistic average, or another average. Also, in the first embodiment, the previously obtained velocity is used as the measurement value based on the assumption that the obtained velocity is an error in step S704. However, instead of this, the velocity based on a plurality of previously obtained measurement values (for example, an average of these) may be used as a measurement value. Also, the average may not be a simple average, and may be a weighted average, a synergistic average, or another average. For example, if it is previously recognized that a variation in the velocity of the object 10 is small, stable measurement can be performed by increasing the value of M. Also, if the magnitude of the variation in the velocity is previously roughly expected, the value of M is decreased as possible on the basis of the magnitude. Accordingly, followability (validity) of the threshold for the error determination can be improved. With the study of the inventors, it is found that the followability is improved by setting M=16 or smaller if the acceleration of the object 10 is about 1 [G].

Embodiment According to Method of Manufacturing Article

The above-described velocimeter according to the embodiment may be used in a method of manufacturing an article. The method of manufacturing the article may include a step of using the velocimeter and measuring the velocity of an object, and a step of processing the object with the velocity measured in the former step. For example, the processing may include at least one of machining, cutting, inspection, assembling, and selection. To be more specific, for example, the extruding velocity of a molded part by an extrusion molding apparatus may be measured and the extruding velocity of the molded part may be controlled. Also, the velocity of a (long) object to be conveyed by a conveyance system may be measured, length measurement may be performed for the object by integrating the velocity obtained by the measurement, and the object may be cut (cut out) to have a target length on the basis of the length measurement. The method of manufacturing the article according to this embodiment can measure the velocity of the object using the velocimeter with high accuracy in a non-contact manner. As compared with the method of related art, the method is advantageous for at least one of the performance, quality, productivity, and manufacturing cost.

The embodiments of the invention have been described above; however, the present invention is not limited to these embodiments, and may be modified or changed in various ways within the scope of the invention.

The present invention can provide, for example, a velocimeter advantageous in view of measurement accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-132151 filed Jun. 30, 2015, which is hereby incorporated by reference herein in its entirety.

What is claimed is:

1. A velocimeter configured to detect light modulated by a moving object with a Doppler effect and measure a velocity of the object, the velocimeter comprising:
    a detector configured to detect the light; and
    a processor configured to obtain a signal from the detector, perform filtering of the signal obtained from the detector by a band pass filter, perform binarization of the signal obtained by the band pass filter, and measure a time duration over a predetermined number of pulse intervals in the signal obtained by the binarization to obtain a measurement value of the velocity,
    wherein the processor is configured to obtain, as an offset value, first amplitude in a plurality of frequencies of the signal obtained from the detector by performing calibration,
    obtain second amplitude in the plurality of frequencies of the signal obtained from the detector by detecting light modulated by the moving object,
    correct the second amplitude based on the offset value,
    determine a frequency of a filtering band of the band pass filter based on the corrected second amplitude, and
    obtain the measurement value of the velocity by filtering the signal obtained from the detector by the band pass filter having the determined frequency of the filtering band.

2. The velocimeter according to claim 1, further comprising:
    an optical system configured to irradiate the object with two lights of which irradiation directions are different from each other, and of which phases change in directions opposite to each other,
    wherein the two lights are reflected by the object and the reflected two lights are detected by the detector.

3. A method of manufacturing an article, the method comprising steps of:
    measuring a velocity of an object using a velocimeter; and
    performing processing for the object of which the velocity has been measured to obtain the article from the processed object,
    wherein the velocimeter is configured to detect light modulated by the object, which is moving, with a Doppler effect, and measure the velocity of the object, and includes:
        a detector configured to detect the light; and
        a processor configured to obtain a signal from the detector, perform filtering of the signal obtained from the detector by a band pass filter, perform binarization of the signal obtained by the band pass filter, and measure a time duration over a predetermined number of pulse intervals in the signal obtained by the binarization to obtain a measurement value of the velocity,
    wherein the processor is configured to obtain, as an offset value, first amplitude in a plurality of frequencies of the signal obtained from the detector by performing calibration,
        obtain second amplitude in the plurality of frequencies of the signal obtained from the detector by detecting light modulated by the moving object,
        correct the second amplitude based on the offset value,
        determine a frequency of a filtering band of the band pass filter based on the corrected second amplitude, and
        obtain the measurement value of the velocity by filtering the signal obtained from the detector by the band pass filter having the determined frequency of the filtering band.

4. The velocimeter according to claim 1, wherein the processor determines a resonance frequency of the band pass filter by determining the frequency of the filtering band of the band pass filter.

5. The velocimeter according to claim 1, wherein the processor obtains, as the offset value, the first amplitude in the plurality of frequencies of the signal obtained from the detector while the object is not placed in detection area of the detector.

6. The velocimeter according to claim 1, wherein the frequency of the filtering band of the band pass filter is variable,
    wherein the processor obtains the first amplitude by filtering the signal obtained from the detector by the band pass filter while the processor changes the frequency of the filtering band of the band pass filter.

7. The velocimeter according to claim 1, wherein the frequency of the filtering band of the band pass filter is variable,
    wherein the processor obtains the second amplitude by filtering the signal obtained from the detector by the band pass filter while the processor changes the frequency of the filtering band of the band pass filter.

* * * * *